Dec. 10, 1929.    S. B. MURPHY    1,739,411
WINDSHIELD HEATER AND WIPER
Filed April 19, 1929    2 Sheets-Sheet 1
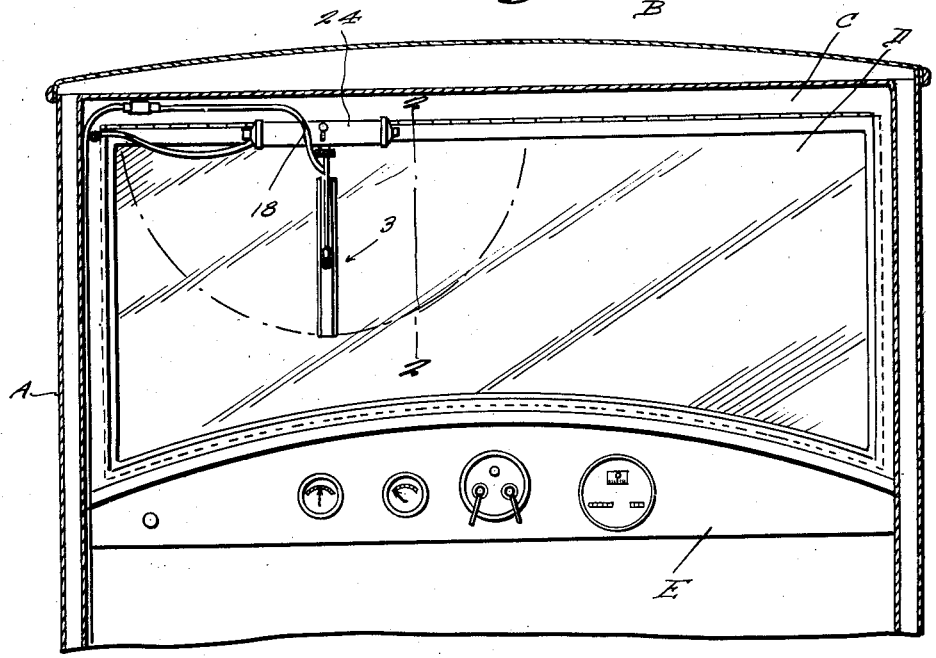
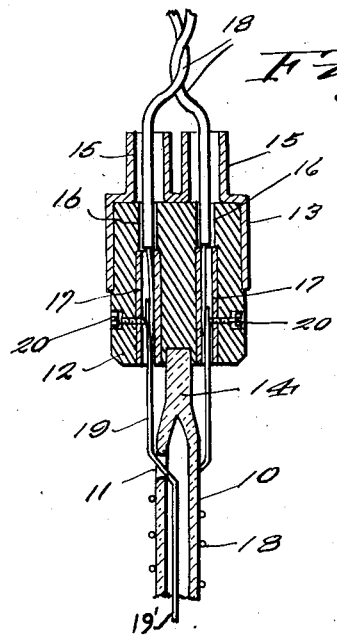
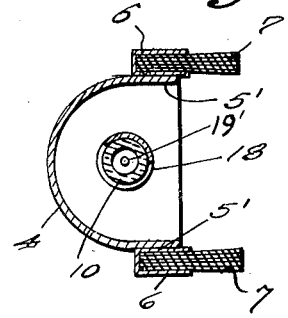
Inventor
Stephen B. Murphy
By Clarence A. O'Brien
Attorney

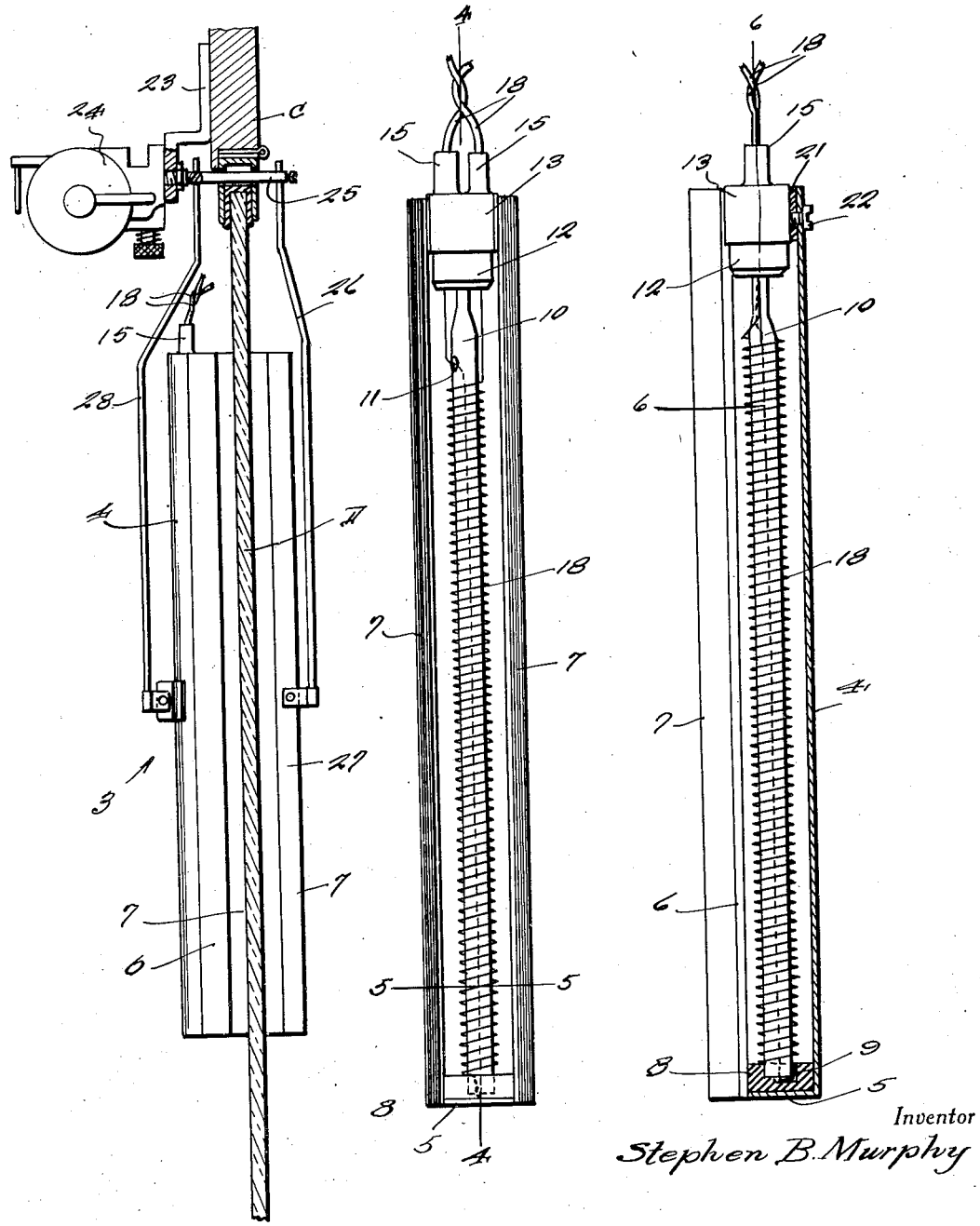

Patented Dec. 10, 1929

1,739,411

UNITED STATES PATENT OFFICE

STEPHEN B. MURPHY, OF PHILADELPHIA, PENNSYLVANIA

WINDSHIELD HEATER AND WIPER

Application filed April 19, 1929. Serial No. 356,424.

This invention appertains to improvements in electric heating and more particularly to a novel combination heater and wiper for automobile windshields.

The principal object of this invention is to provide a heater for windshields for maintaining a predetermined portion of the windshield free from the formation of ice during wet freezing weather.

Another object of the invention is to provide a heater for windshields operable efficiently without the consumption of as much current as is necessary in the heating of windshields by devices now in use.

Still another object of importance is to provide a device in the form of a combination windshield wiper and heater which while heating the windshield will also remove any condensation thereon.

These and other objects of the invention will become more apparent to the reader after considering the invention as described and claimed hereinafter.

In the drawing:—

Figure 1 represents the vertical sectional view through a fragmentary portion of an automobile body looking toward the windshield equipped with the present invention.

Fig. 2 represents a vertical sectional view through the windshield, taken on substantially line 2—2 of Fig. 1 and looking in the direction of the invention.

Fig. 3 is a side elevation of the novel combination wiper and heater.

Fig. 4 represents a longitudinal sectional view through the combination device taken substantially on the line 4—4 of Fig. 3.

Fig. 5 represents a cross sectional view of the structure taken substantially on the line 5—5 of Fig. 3.

Fig. 6 represents a fragmentary longitudinal sectional view of certain details of the invention, this view taken substantially on the line 6—6 of Fig. 4.

Referring to the drawings wherein like numerals designate like parts, Fig. 1, illustrates fragmentarily, a portion of an automobile structure, including the sides A—A, the top B, the windshield frame C, and pane D, mounted above the instrument board E.

The novel combination device is generally referred to by the numeral 3 and consists in the construction of an elongated shell 4 of some suitable heat deflecting metal, such as brass. The end 5 of the shell is closed while its opposite end is open and the interior side thereof, is highly polished to provide a reflecting surface. The longitudinal edge portions 5'—5' are disposed in substantial parallelism with respect to each other and each has secured along the outer side thereof, a fastener strip 6 for retaining a squeegee 7 for projection beyond the longitudinal edge of the shell.

A block 8 of suitable di-electric material is disposed against the closed end 5 of the shell 4, and secured in this position by suitable means, (not shown). The block 8 is provided with a recess 9 for receiving one end of an elongated tube 10 of di-electric material, such as glass. The tube 10 is provided with an opening 11 adjacent the opposite end.

The plug 12 of suitable di-electric material has a protective cap 13 engaged over one end and is recessed at its opposite end to receive the reduced end 14 of the tube 10. Tubular members 15—15 project from the cap 13 and are in registry with bores 16—16 extending longitudinally through the plug 12. Tubes 17—17 of suitable current conductive material are disposed within the bores 16—16 for receiving the bare ends of the conductors 18.

A resistance coil 19 is convoluted on the tube 10 and a lead 19' extends from the distal end of the coil through the tubular core 10, out through the opening 11 for disposition within one of the tubes 17. The opposite end of the coil 18 is disposed within the remaining tube 17 and set screws 20 are threadedly engaged through the side of the plug 12 for clamping the coil ends against the bared ends of the conductors 18.

The plug and cap are to be disposed within the open end of the shell 4 with a packing strip 21 interposed between the cap 13 and the shell 4. A set screw 22 is employed for securing the plug and cap within the shell 4 in the manner shown in Fig. 4.

Fig. 2 shows a bracket 23 supporting a suction operable motor 24 of the usual type employed for actuating window wipers. A shaft 25 extends from the motor 24 through the windshield frame C and has the arm 26 of an oscillatory squeegee 27 secured thereto. The arm 26 controls the squeegee 27 at the outside of the windshield pane C while an arm 28 is secured at its upper end to the shaft 25, for moving the combination heater and wiper device in co-ordination with the squeegee 27.

The foregoing description has been couched in general terms, but it is to be understood that numerous changes in the specific shape, size, materials, may be resorted to without departing from the spirit and scope of the invention as hereinafter claimed.

Having thus described my invention, what I claim as new is:—

A window heater and wiper of the character described comprising a vertically disposed elongated shell of substantially U-shaped cross section, said shell closed at its lower end, an insulating block mounted in the lower end, an insulating plug in the upper end of the shell having bores extending longitudinally therethrough, means for securing the plug in the shell, a cap on the upper portion of the plug having tubular extensions aligned with the bores, metallic sleeves in the lower portions of the bores, conductor wires extending through the extensions on the cap and into the bores of the plug from the upper end thereof, a tube of non-conducting material supported at its opposite ends in the plug and the block and extending longitudinally through the shell in spaced relation to the walls thereof, a conducting wire convoluted on the tube and extending longitudinally therethrough and having its opposite ends extending into the bores of the plug from the lower end thereof and overlapping the first named conductor wire therein, securing screws threaded through the plug and the sleeves and extending transversely into the bores for engagement with the wires in a manner to clamp the same together for providing electrical connection therebetween and windshield wiping elements mounted on the opposite longitudinal side edges of the shell and extending forwardly therefrom for engagement with the wind shield.

In testimony whereof I affix my signature.

STEPHEN B. MURPHY.